United States Patent [19]

Makino

[11] Patent Number: 4,814,881
[45] Date of Patent: Mar. 21, 1989

[54] SOLID-STATE IMAGE SENSOR CIRCUIT
[75] Inventor: Masamori Makino, Hachioji, Japan
[73] Assignee: Konica Corporation, Tokyo, Japan
[21] Appl. No.: 133,342
[22] Filed: Dec. 15, 1987

[30] Foreign Application Priority Data

Mar. 27, 1987 [JP] Japan ................................ 62-71573

[51] Int. Cl.$^4$ ........................................... H04N 5/217
[52] U.S. Cl. ............................... 358/167; 358/213.16
[58] Field of Search ............. 358/213.16, 167, 213.15, 358/213.24

[56] References Cited

U.S. PATENT DOCUMENTS 3,800,078  3/1974  Cochran et al. .................... 358/167
4,525,741  6/1985  Chahal et al. ................... 358/213.16

FOREIGN PATENT DOCUMENTS 57-16173  1/1982  Japan .
60-108819  6/1985  Japan .
60-202424  10/1985  Japan .

*Primary Examiner*—Jin F. Ng
*Assistant Examiner*—Stephen Brinich
*Attorney, Agent, or Firm*—Finnegan, Henderson, Farabow, Garrett, & Dunner

[57] ABSTRACT

A solid-state image sensor circuit includes a solid-state image sensor, an optical system, an amplifier, a hold circuit, and an A/D converter. In the solid-state image sensor, some of light-receiving elements are shielded from light. The optical system forms an image on the solid-state image sensor. The amplifier amplifies an output from the solid-state image sensor. The hold circuit holds an output from a shielded portion of the solid-state image sensor. The A/D converter A/D-converts an output voltage from the hold circuit using the output from the amplifier as a lowest analog reference voltage.

4 Claims, 3 Drawing Sheets

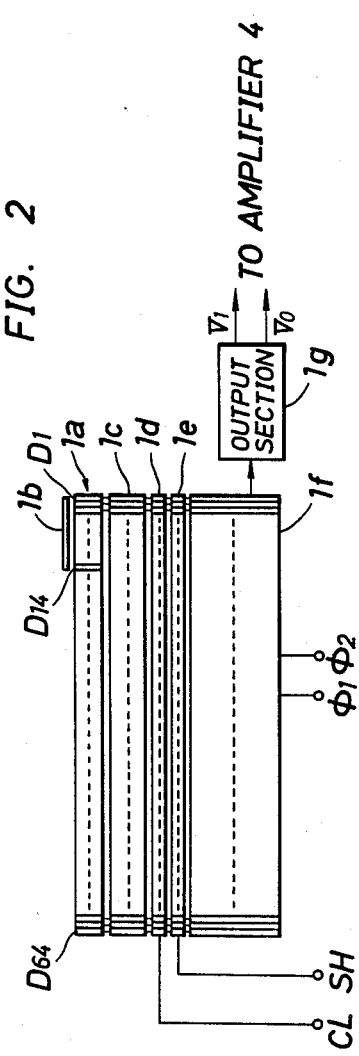
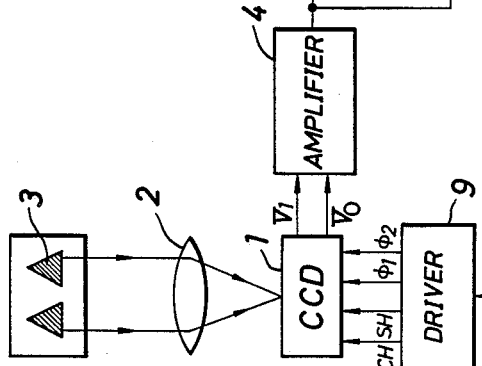
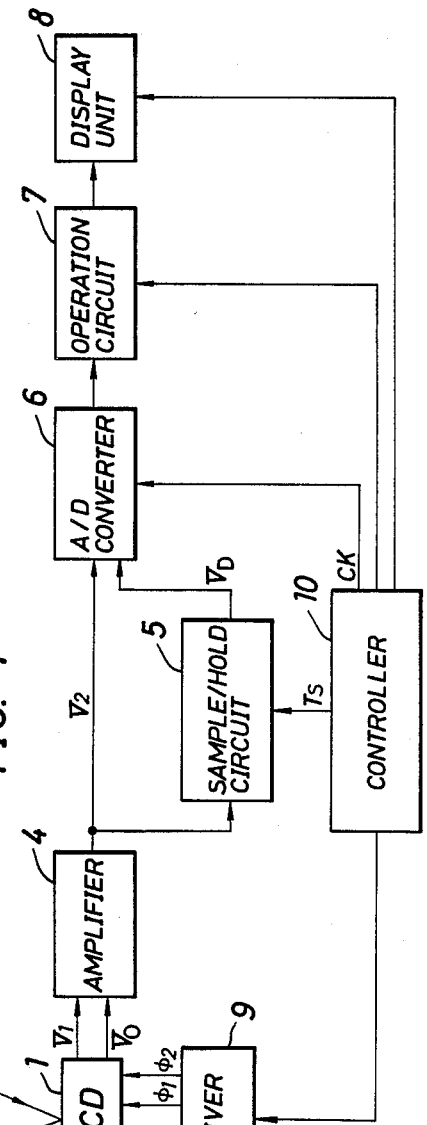
FIG. 1
FIG. 2

FIG. 5(a) CLEAR PULSE CL

FIG. 5(b) SHIFT PULSE SH

FIG. 5(c) TRANSFER PULSE $\phi_1$ $\phi_2$

FIG. 5(d) IMAGE SIGNAL $\overline{V}_1$

FIG. 5(e) INVERTED AND AMPLIFIED IMAGE SIGNAL $\overline{V}_2$

FIG. 5(f) DARK OUTPUT $\overline{V}_D$

FIG. 5(g) SAMPLE/HOLD SIGNAL $T_S$

FIG. 5(h) DIGITAL IMAGE SIGNAL

SOLID-STATE IMAGE SENSOR CIRCUIT

BACKGROUND OF THE INVENTION

Field of the Invention

The present invention relates to a solid-state image sensor circuit for outputting an image signal from a solid-state image sensor as a digital value.

Solid-state image sensors such as a CCD (Charge Coupled Device) are small in size and light in weight. Therefore, they are widely used in various fields, e.g., for focusing detection in a camera, image reading in a facsimile system or copy machine, and for a sensor of an assembly robot.

An image signal output from a solid-state image sensor is normally converted into a digital signal to be processed. However, the output from the image sensor may include an output component which is generated due to a dark current regardless of light reception, and hence accurate image data cannot be obtained unless such a component is removed from the image signal.

Therefore, some of light-receiving elements of a conventional image sensor are covered with an aluminum film to form a shielded portion and an output (a dark output) therefrom is subtracted from the sensor output by a differential amplifier, thereby removing the dark output (Japanese Patent Application No. 60-108815). In another conventional image sensor, since dark outputs vary depending on light-receiving elements, a shutter is provided to each light-receiving element. A dark output from each element, which is obtained while light is shielded by a corresponding shutter, is stored in a memory, and each stored dark output is subtracted from an image signal (Japanese Patent Application No. 60-202424). In still another conventional image sensor, a dark output is calculated when an apparatus is assembled and stored in a nonvolatile memory. When an image signal is calculated, the dark output is read out from the memory, and subtracted from the dark output component (Japanese Patent Application No. 57-16173).

However, in such conventional circuits, a subtraction circuit, a shutter mechanism, or a memory is required, resulting in a complicated circuit arrangement. In addition, if a dark output component stored during assembly of the apparatus is subtracted, changes in dark output due to changes in temperature after assembly cannot be obtained, and hence an accurate image signal cannot be obtained.

SUMMARY OF THE INVENTION

The present invention has been made in consideration of the above situation, and has as its object to remove a dark output component from an image signal supplied from a solid-state image sensor using a simple arrangement. In order to achieve the above object, a solid-state image sensor circuit according to the present invention comprises a solid-state image sensor in which some of light-receiving elements are shielded from light, an optical system for forming an image on the solid-state image sensor, an amplifier for amplifying an output from the solid-state image sensor, a hold circuit for holding an output from the shielded portion of the solid-state image sensor, and an A/D converter for A/D-converting an output from the amplifier using an output voltage from the hold circuit as the lowest analog reference voltage.

BRIEF DESCRIPTION OF THE DRAWINGS

FIG. 1 is a block diagram wherein a solid-state image sensor circuit according to the present invention is applied to a printed matter inspection apparatus;

FIG. 2 is an enlarged view of a solid-state image sensor;

FIGS. 5(a)–5(h) is a timing chart showing an operation of the circuit in FIG. 1.

DETAILED DESCRIPTION OF THE PREFERRED EMBODIMENT

Figure 3:
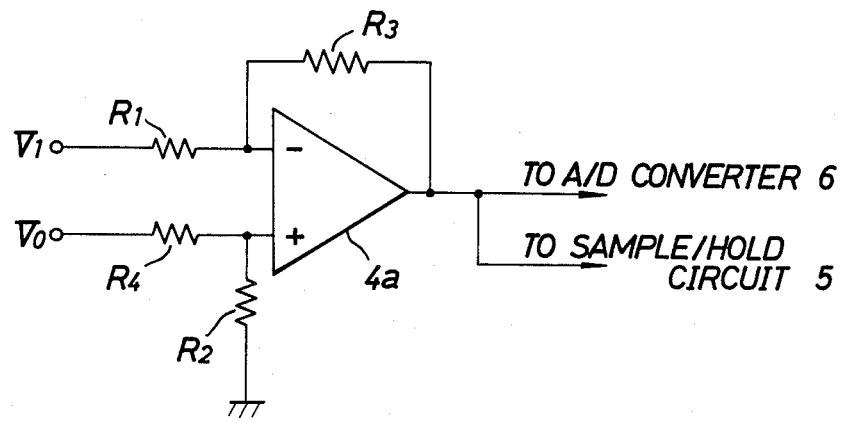
FIG. 3 is a view showing an arrangement of an amplifier.

FIG. 1 is a block diagram wherein a solid-state image sensor circuit according to the present invention is applied to a printed matter inspection apparatus for inspecting the quality of a finished printed matter.

Referring to FIG. 1, reference numeral 1 denotes a CCD as a solid-state image sensor in which some of light-receiving elements are shielded from light; 2, an imaging lens for forming a printed image 3 on the CCD 1; 4, an amplifier for amplifying an image signal from the CCD 1; 5, a sample/hold circuit for temporarily holding the image signal from the shielded portion of the CCD 1; 6, an A/D converter for A/D-converting an output from the amplifier 4 using an output voltage from the sample/hold circuit 5 as the lowest analog reference voltage; 7, an operation circuit for calculating the width of a pattern of the printed image 3 on the basis of a digital image signal output from the A/D converter 6; 8, a display unit, constituted by an LED and the like, for displaying whether irregularity in printing of the printed image 3 is found or not, i.e., whether the quality thereof falls within a rotated range; 9, a driver for driving the CCD 1; and 10, a controller with a built-in microcomputer for commanding an operation timing of each circuit.

As shown in FIG. 2, the CCD 1 includes a photodiode array, constituted by 64 pixels $D_1$ to $D_{64}$, for generating electric charges in accordance with an intensity of light, an aluminum mask 1b for shielding a portion of the photodiode array 1a, i.e., the pixels $D_1$ to $D_{14}$ from light, an accumulation electrode 1c for accumulating the electric charges supplied from the photodiode 1a, a clear electrode 1d for clearing the electric charges accumulated in the accumulation electrode 1c in response to a clear pulse CL from the driver 9, a shift electrode 1e for shifting the electric charges accumulated in the accumulation electrode 1c to a transfer electrode 1f in response to a shift pulse SH from the driver 9, which sequentially outputs the accumulated electric charges in response to transmission pulses $\phi_1$ and $\phi_2$ supplied from the driver 9, and an output portion 1g for converting an electric charge signal into a voltage signal as an image signal $V_1$.

As shown in FIG. 3, the amplifier 4 is constituted by an inverting amplifier 4a and resistors $R_1$ to $R_4$. The image signal $V_1$ supplied from the CCD 1 is extracted from the output portion 1g while its voltage is decreased because the accumulated electric charges are discharted from a predetermined initial voltage $V_0$. For this reason, the image signal $V_1$ is input to the inverting input terminal of the inverting amplifier 4a and the initial voltage $V_0$ is input to the non-inverting input terminal. The image signal $V_1$ is inverted and amplified by the amplifier 4 and is output to the A/D converter 6 and the sample/hold circuit 5 as an image signal $V_2$.

Figure 4:
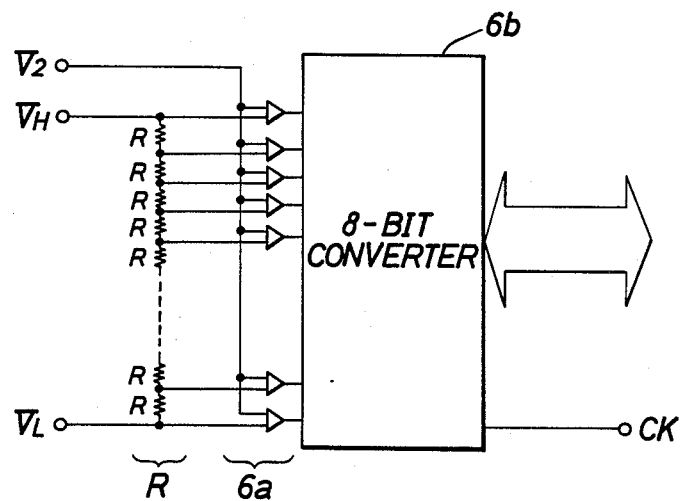
FIG. 4 is a view showing an arrangement of an A/D converter.

As shown in FIG. 4, the A/D converter 6 includes resistors R for dividing a voltage between a lowest analog reference voltage $V_L$ and a highest analog reference voltage $V_H$ into 256 intervals, comparators 6a for discriminating a voltage level of the image signal $V_2$ input from the amplifier 4, and an 8-bit converter 6b. An output voltage from the sample/hold circuit 5 is input to the A/D converter 6 as the lowest analog reference voltage $V_L$. A timing of A/D conversion is controlled by a signal CK supplied from the controller 10. The analog reference voltage $V_H$ is predetermined in accordance with a voltage level of the image signal $V_2$.

An operation of the circuits will be described with reference to the timing chart of FIG. 5.

The clear pulse CL is output from the driver 9 in response to a command from the controller 10 (FIG. 5(a)) to clear unnecessary electric charges accumulated in the accumulation electrode 1c. Thereafter, electric charges are accumulated in accordance with an intensity of reflected light from the printed image 3. When the electric charges are accumulated for a predetermined period of time t, the shift pulse SH is output from the driver 9 in response to a command from the controller 10 (FIG. 5(b)) to transmit the electric charges in the accumulation electrode 1c to the transfer electrode 1f. The transfer pulses $\phi_1$ and $\phi_2$ are output from the driver 9 in synchronism with the shift pulse SH in response to a command from the controller 10 (FIG. 5(c)). The image signal $V_1$ is output to the amplifier 4 through the output portion 1g (FIG. 5(d)). The image signal $V_1$ is inverted and amplified (FIG. 5(e)) by the amplifier 4 to be output to the A/D converter 6 and the sample/hold circuit 5 as the image signal $V_2$. Since the components in the image signals $V_1$ and $V_2$ corresponding to the pixels $D_1$ to $D_{14}$ are shielded from light, they have no relationship with the printed image 3 and represent a dark output $V_D$ of the photodiode array 1 (FIG. 5(f)).

Subsequently, the controller 9 outputs a sample/hold signal $T_s$ to the sample/hold circuit 5 while the amplifier 4 is outputting only an image signal corresponding to the pixels $D_1$ to $D_{14}$, i.e., when the image signal $V_2$ is constituted by only the dark output $V_D$ (FIG. 5(g)). The sample/hold circuit 5 holds a voltage value of the dark output $V_D$ and outputs it to the A/D converter 6 as the lowest analog reference voltage $V_L$. Since the A/D converter 6 converts the image signal $V_2$ using the dark output $V_D$ as the lowest analog reference voltage $V_L$, the dark output component is substantially removed from the image signal $V_2$, thereby obtaining a digital signal as shown in FIG. 5(h)).

At the end of the operation, irregularity in printing of the printed image 3 is calculated using the digital image signal by the operation circuit 7. If the resultant value falls within the allowable range, the operation circuit 7 causes the display unit 8 to display "GOOD", and if it does not, "NO GOOD".

Although the present invention has been described by exemplifying the printed matter inspection apparatus in the above embodiment, the present invention can be applied to other apparatuses using solid-state image sensors such as an automatic focusing detector for a camera and a document image reader for a copy machine.

When the present invention is to be applied to an automatic focusing detector for a camera, it is extremely difficult to keep brightness of an object constant, i.e., the brightness of the object varies. For this reason, when an image of the object to be photographed is photoelectrically converted, brightness of an object greatly varies each time the object is photographed. Consequently, if the same photoelectric conversion period is set for each photographing, when the object is bright, a photoelectric conversion output is saturated, and when it is dark, the output level is decreased to such an extent that it is difficult to detect the output.

In order to eliminate such a drawback, a means for changing the photoelectric conversion period in accordance with brightness of an object may be arranged. However, in this case, a circuit arrangement becomes complicated, and hence the manufacturing cost is inevitably increased. For this reason, such an arrangement cannot be employed except for an expensive camera which is generally called a high-class camera.

In order to apply the above arrangement to a camera of a low price, saturation of a photoelectric conversion output may be detected when an object is bright to predetermine brightness at which the output is saturated. When brightness of the object exceeds the predetermined brightness, an optical filter or the like can be inserted in front of the image sensor, thereby detecting the photoelectric conversion output while saturation thereof is controlled. However, in the above arrangement, when the object is dark, the above problem is still posed. That is, due to a decrease in the photoelectric conversion output, a dark output or noise from the image sensor is more influential than in the case wherein the object is bright. For this reason, the photoelectric conversion output cannot be simply amplified, but the dark output or noise from the image sensor must be removed.

The dark output and the like can be removed by applying the present invention and the circuit arrangement is considerably simplified. Therefore, an automatic focusing detector can be provided to a camera of a low price.

As has been described above, according to the present invention, since a subtractor, a shutter mechanism, or a memory is not required, a dark output from the solid-state image sensor can be removed with a simple arrangement. Furthermore, according to the present invention, the dark output is always subtracted during the operation of the solid-state image sensor. Therefore, an accurate image signal which is not affected by changes in temperature can be obtained.

What is claimed is:

1. An image sensor circuit comprising:
   an image sensor including a plurality of light-receiving elements, said light receiving elements each outputting a signal in response to light incident thereon;
   optical means for forming an image on said image sensor;
   shielding means disposed between said image sensor and said optical means for shielding at least one of said light receiving elements to provide at least one shielded light receiving element;
   amplifier means for amplifying said signals from said light receiving elements;
   controller means for outputting a sample/hold signal while said amplifier means is outputting an amplified signal corresponding to said shielded light receiving elements;
   sample/hold means in communication with said amplifier means and said controller means for sampling signals from said amplifier while said sample/hold signal is being outputted from said controller means and holding the value of said sampled signals as a dark current value; and analog to digital converter means for converting said signals from said amplifier means from an analog to a digital value using said dark current value as a lowest analog reference voltage.

2. A circuit according to claim 1, wherein said solid-state image sensor comprises a CCD.

3. An image sensor circuit as recited in claim 1, including: operation means for calculating irregularity in printing of a printed image on the basis of an output from said solid-state image sensor circuit, and display means for displaying a result calculated by said operation means.

4. An image sensor circuit as recited in claim 1, including: operation means for calculating an in-focus position of a photographing lens on the basis of an output from said solid-state image sensor circuit.

* * * * *